United States Patent
Cucchi et al.

(10) Patent No.: US 6,320,911 B1
(45) Date of Patent: Nov. 20, 2001

(54) SYSTEM FOR PROVIDING INFORMATION RELATING TO THE SOURCE FREQUENCY IN A DIGITAL RECEIVE-TRANSMIT SYSTEM

(75) Inventors: Silvio Cucchi; Marzio Orsucci, both of Milan (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/115,005

(22) Filed: Jul. 14, 1998

(30) Foreign Application Priority Data

Jul. 15, 1997 (IT) .............................. TO97A0644

(51) Int. Cl.[7] .................................................. H04L 27/00
(52) U.S. Cl. ..................... 375/259; 324/76.39; 324/76.11
(58) Field of Search .................... 375/213, 224, 375/362, 371, 359; 324/76.41, 76.11, 76.39, 76.77, 76.42; 708/309; 379/14, 16; 455/67.1, 67.5, 226.1; 702/57, 75, 108, 127

(56) References Cited

U.S. PATENT DOCUMENTS

| | | | |
|---|---|---|---|
| 5,557,196 | * | 9/1996 | Ujiie .................................. 324/76.77 |
| 5,663,933 | * | 9/1997 | Eitrich ................................. 368/119 |
| 5,719,782 | * | 2/1998 | Mitsuoka ............................... 702/75 |
| 5,748,570 | * | 5/1998 | Komoda .............................. 368/202 |
| 5,930,294 | * | 7/1999 | Chapman ............................. 375/213 |
| 5,943,375 | * | 8/1999 | Veintimilla ........................... 375/355 |
| 6,028,425 | * | 2/2000 | Yamashita et al. .................... 324/120 |

OTHER PUBLICATIONS

"Jitter in Synchronous Residual Time Stamp" by Murakami, in publiation IEEE Trans. Commun., vol. 44, No. 6, pp. 742–748, Jun. 1996.
ETSI ITU–J81 Standard, Sep. 1993.
ETSI ITU–1.363.1 Standard, Aug. 1996).
"Synchronous Techniques for Timing Recovery in BISDN" by lau et al. IEEE Transactions on Communications vol. 44, No. 6, Jun. 1, 1996, pp. 742–748.

* cited by examiner

*Primary Examiner*—Jean Corrielus
*Assistant Examiner*—Emmanuel Bayard
(74) *Attorney, Agent, or Firm*—Ware, Fressola, Van Der Sluys & Adolphson LLP (57) ABSTRACT

A system for providing information on the clock frequency of a data source in a digital receive-transmit system, where the clock frequency value of the data source is sent at a preset rate (FP), comprising a first signal (FS) at a first frequency (FQ1) associated with the data source, a second signal (FT) at a second frequency (FQ2) associated with the transmission system, measuring means for the first frequency (FQ1) of the first signal (FS) against the second frequency (FQ2) of the second signal (FT). According to the present invention the measuring means (CP, CN, CM) operates at a measuring rate (F) higher than the preset rate (FP) and a post-processing means (P) is provided to send a coded signal (U') to the receiver (R).

21 Claims, 3 Drawing Sheets

SYSTEM FOR PROVIDING INFORMATION RELATING TO THE SOURCE FREQUENCY IN A DIGITAL RECEIVE-TRANSMIT SYSTEM

TECHNICAL FIELD

The present invention relates to a system for providing information on the clock frequency of a data source in a digital receive-transmit system.

BACKGROUND OF THE INVENTION

In order to synchronize the receiver apparatus, digital receive-transmit systems are usually required to send information based on the clock frequency of a data source, which may be represented eg. by the source of a digital video signal. It is known, for instance, to measure the clock frequency of the data source compared to the transmission frequency of the transmitter system data, which is already known as such to the receiver apparatus. The value of the frequency measurement, duly coded, will then be sent to the receiver apparatus where it is decoded and used for clocking purposes.

Figure 1:
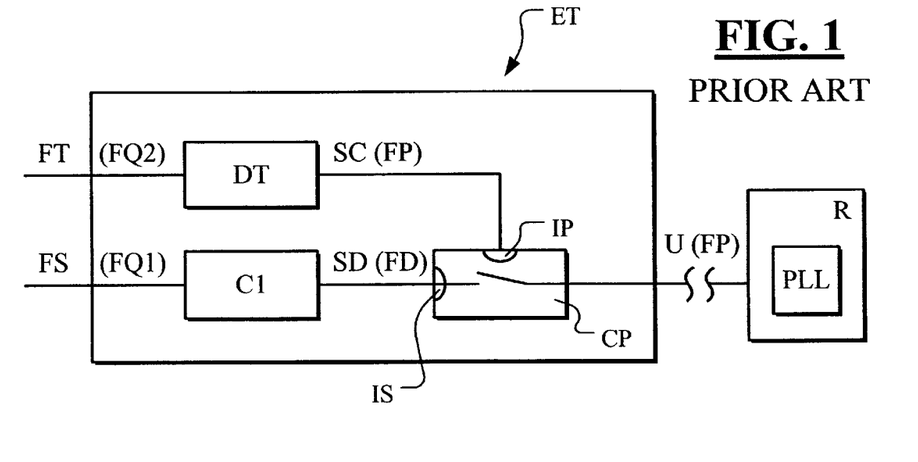
FIG. 1 shows a block diagram of a first system for providing information on the clock frequency of a data source in a digital receive-transmit system according to the known art.

FIG. 1 shows an example of a frequency measuring system of the data source as described in ETSI ITU-J81 Standard, to transmit a digital television signal on a 34368 Kb/s flow.

An ET system is described showing a transmission flow FT sent at a frequency FQ2 of 34368 KHz to a suitable frequency divider DT, which divides frequency FQ2 of the transmission flow FT by 4296 and supplies a sampling signal SC at a measuring frequency FP of 8 KHz. Said sampling signal SC is sent in fact to a pilot input IP of a sampler CP. A data flow FS from a video source not shown here, feeds a counter modulo-2 C1 at a rated frequency FQ1 of 27 MHz, which outputs a signal SD at a halved frequency FD, i.e. 13,5 MHz. Said signal SD enters the signal input IS of the sampler CP where it is sampled. Since the number of cycles counted within a time interval of 125 $\mu$s corresponding to the measuring frequency FP of 8 KHz of the sampling signal SC is theoretically 1687.5, a coded U signal having alternatively 0 and 1 values in an interval of 125 $\mu$s is obtained from the sampler output CP provided the data flow SF always maintains its rated frequency FQ1, where 0 corresponds to 1687 cycles counting and 1 to 1688 cycles counting. Therefore, ET system measures the frequency FQ1 of the data flow FS based on one-cycle precision and supplies it based on one-cycle precision to a receiver R. Said receiver R is known as such and will not be further described in detail, as its implementation opportunities are quite varied. Said receiver R contains anyway a phase locked loop PLL, that could for instance be designed according to the known state of art to substantially input receive the coded signal U, which is a digital signal, make a phase comparison with a previously stored phase value and supply analogically the comparison result through a lowpass filter to a controlled oscillator under voltage supplying the frequency FQ1 to the receiver R.

It should be noted for a better understanding of the following description and eliminate possible misunderstandings between frequency and phase measurements, that due to the small frequency deviations of the frequency FQ1 involved, the sampler CP performs a counter phase measurement C1 every 125 $\mu$s, which is immediately converted to a frequency measurement, intended as a physical quantity and measured as a number of cycles within a time unit. A phase deviation caused by a change in frequency FQ1 or FQ2 is converted to a variation of the time instant where the counter C1 is sampled, then eventually to a different frequency value. The sampler CP provides anyway a frequency measurement, which, once processed, provides a phase measurement.

It is possible to go from a phase measurement to a frequency measurement through a simple integration, so that in fact the use of one or other quantity is generally a question of convenience and adequacy.

In the ET system, the coded signal U containing as such only the information supplied every 125 $\mu$s, if the counting is 1687 or 1688, will be sent to the receiver R, which according to ETSI Standard converts the coded signal U in phase increments and decrements, so that 1687 will mean −1 cycle and 1688+1 cycle.

Since the receiver R uses the information from the coded signal U to operate on the phase locked loop PLL designed to work on the frame frequency, which is by far lower than 8 KHz, said phase locked loop PLL tends to follow the mean value of the sum of the phase increments and decrements determined by the coded signal U, thus obtaining the information of the frequency phase FQ1.

Therefore, according to ETSI Standard if the frequency FQ1 takes the rated value, a signal has to be supplied to the receiver R consisting of a coded signal U represented by a set of values such as eg. 0101010101, which, after an integration of any kind, such as for instance converting the set in phase increments and decrements, correspond to a constant phase value of −0.5 cycles, i.e. −$\pi$. If, on the contrary, there is a phase shift of the frequency FQ1, this will be associated with the transmission of a sequence such as 01011010, which after integration in the receiver R performed by its digital loops will be −$\pi$, −$\pi$, $\pi$, $\pi$, corresponding to a whole cycle shift.

This means that using ET transmission system according to ETSI Standard, the receiver R may detect the frequency FQ1 with a one-cycle precision, whereas when the frequency deviation FQ1 is below this value no frequency deviation will be detected.

For clarity of illustration an example is here given starting first with the frequency rated values, where:
'0' stands for: 3374 cycles in 125 $\mu$s
'1' stands for: 3376 cycles in 125 $\mu$s
true input frequency values to the counter C1: 1687.5 1687.5 1687.5. . . values counted by the counter C1:

1687 1688 1687 1688 1687 1688 1687. . . frequency measured by sampler CP (Modulo-2) and transmitted at a frequency of 8 KHhz:

| 0 | 1 | 0 | 1 | 0 | 1 | 0 |
|---|---|---|---|---|---|---| cumulative phase measured, i.e. measuring and summing up phase increments:

| 0 | 1 | 1 | 2 | 2 | 3 | 3 |
|---|---|---|---|---|---|---| actual phase:

| 0.5 | 1 | 1.5 | 2 | 2.5 | 3 | 3.5 |
|---|---|---|---|---|---|---| phase difference between the measured phase and the actual phase:

| −.5 | 0 | −.5 | 0 | −.5 | 0 | −.5 |
|---|---|---|---|---|---|---|

Now, as it can be seen, if this data is processed by multiplying by 2 and adding a suitable constant, eg. 0,5, a phase difference on the at 27 MHz flow is obtained:

| −0,5 | 0.5 | −0.5 | 0.5 | −0.5 | 0.5 | −0.5 |
|---|---|---|---|---|---|---|

After all, it appears that the message being transmitted, i.e. a modulo-2 frequency measurement, represents a frequency coding with local errors but such to give the true value after being averaged.

If the frequency of the data flow changes as compared with the frequency of the transmission flow (eg. slow increase), at a certain time the system will show a one-cycle phase difference.

-continued

Counted values:
    1687    1688    1687    1688    1687    1688    1687...
measured frequency (modulo-2) transmitted at the frequency of 8 KHz:
    0        0        0        1        1        0        1
measured phase:
    0        1        1        2        3        3        4
theoretical phase:
    0,5     1      1.5     2     2.5     3     3.5
phase difference:
   −.5     0     −.5     0    −.5     0    −.5
phase difference (27 MHz) neglecting one constant (phase difference * 2 + 0.5):
   −0.5   0.5   −0.5   0.5   1.5   0.5   1.5

The mean value of this phase difference goes from a mean value '0' to a mean value '1', achieving one-cycle resolution of the 27 MHz frequency.

High frequency phase shifts, the frequency being high as 4 KHz, are not detected by the loop PLL in the receiver, which is a lowpass filter with a lower equivalent band, i.e. surely lower than 1 KHz, working on the frame frequency.

A frequency drift of the same extent, measured over a 16 KHz frequency cycle, where the theoretical cycles counting is 843.75, has a half-cycle resolution.

Figure 2:
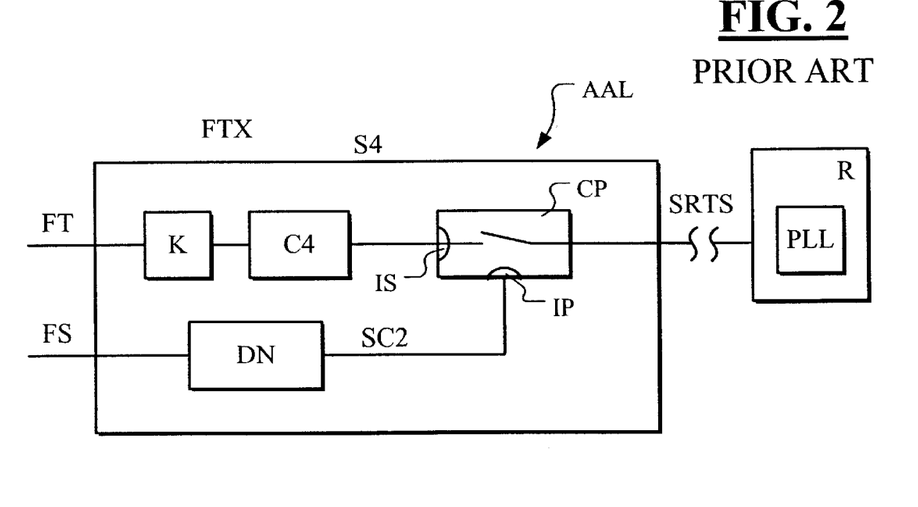
FIG. 2 shows a block diagram of a second system for providing information on the clock frequency of a data source in a digital receive-transmit system according to the known art.

A similar data source frequency measuring system is defined in the Recommendation ITU-T I.363 concerning MPEG Standard (AAL1) (ATM Adaptation Layer type 1) as shown in FIG. 2.

An AAL system is there described, where the transmission flow FT is led through a frequency divider K, obtaining an output signal at a reduced frequency FTX, which feeds a modulo-16 counter C4. Thus, said modulo-16 counter C4 performs with 4 bits and outputs a 4-bit signal S4, whereas data flow FS goes through an adequate frequency divider DN, whose output has a sampling signal SC2 with a suitable frequency to drive the sampler circuit CP, which samples the 4-bit signal S4 and outputs the modulo-16 phase measurement SRTS. Said phase measurement SRTS is called Synchronous Residual Time Stamp and contains phase information for the receiver R.

The systems described above allow recovery of the data-source clock signal to the receiver apparatus, providing the phase measurement and using a phase locked loop PLL as already reported with reference to FIG. 1.

As to special frequency ratios, eg. as described in the publication IEEE Trans. Commun., Vol. 44, no. 6, pp. 742–748, June 1996 K. Murakami 'Jitter in Synchronous Residual Time Stamp', a low frequency 'jitter' may be determined, i.e. a distortion due to synchronization errors, which is difficult to filter from the phase locked loop due to its low frequency. In other words, eg. with reference to ETSI Standard, cycle precision warranted by the Standard specifications implies that when the frequency information approaching the receiver deviates very slowly, namely a low frequency 'jitter', the receiver is unable to detect any frequency deviation in due time to avoid a distortion.

This may lead to an unacceptable synchronization of the signal received, specifically in the instance of a television signal particularly sensitive to temporary 'jitter'.

SUMMARY OF THE INVENTION

It is an object of the present invention to solve the above mentioned drawbacks and indicate a system for providing information on the clock frequency of a data source in a digital receive-transmit system, so as to be an improved and more effective solution as compared with the solutions already known.

In this frame it is the main object of the present invention to indicate a system for providing information on the clock frequency of a data source in a digital receive-transmit system that allows for the conversion of a low-frequency 'jitter' to a high-frequency 'jitter', which is easily removable when it is received.

A further object of the present invention is to provide a system for providing information on the clock frequency of a data source in a digital receive-transmit system to ensure a more precise measurement and transmit it to the receiver in a way that is compatible with transmission standards.

According to the present invention a system for providing information on the clock frequency of a data source in a digital receive-transmit system is indicated incorporating the features of the annexed claims that are an integral part of this description.

The present invention further provides a frequency measurement method of a data source incorporating the features of the annexed claims that are an integral part of this description.

The present invention further provides a transmission apparatus, suitable to send the clock frequency value of a data source at a preset rate for correct reception of the information at a receiver means, comprising a first signal at a first frequency associated with the data source, a second signal at a second frequency associated with the transmission system, the second signal used as a reference signal to measure the first signal, means for measuring the first frequency of the first signal compared to the second frequency of the second signal, wherein the measuring means for the frequency measurement of the first frequency of the first signal are prearranged to perform said measurement at a measuring rate higher than the preset rate, and that a post-processing means is provided to code the frequency measurement and supply a coded signal at such a preset rate to the receiver means. Moreover, the present invention provides a receiver apparatus to receive data from a digital data source transmitted at a preset rate as described above.

BRIEF DESCRIPTION OF THE DRAWINGS

Other objects, features and advantages of the present invention will be apparent from the following detailed description and annexed drawings, which are only supplied by way of an explanatory non limiting example, wherein.

BEST MODE FOR CARRYING OUT THE INVENTION

FIGS. 1 and 2 will not be further described as already dealt with in the introductory part of the present description.

Figure 3:
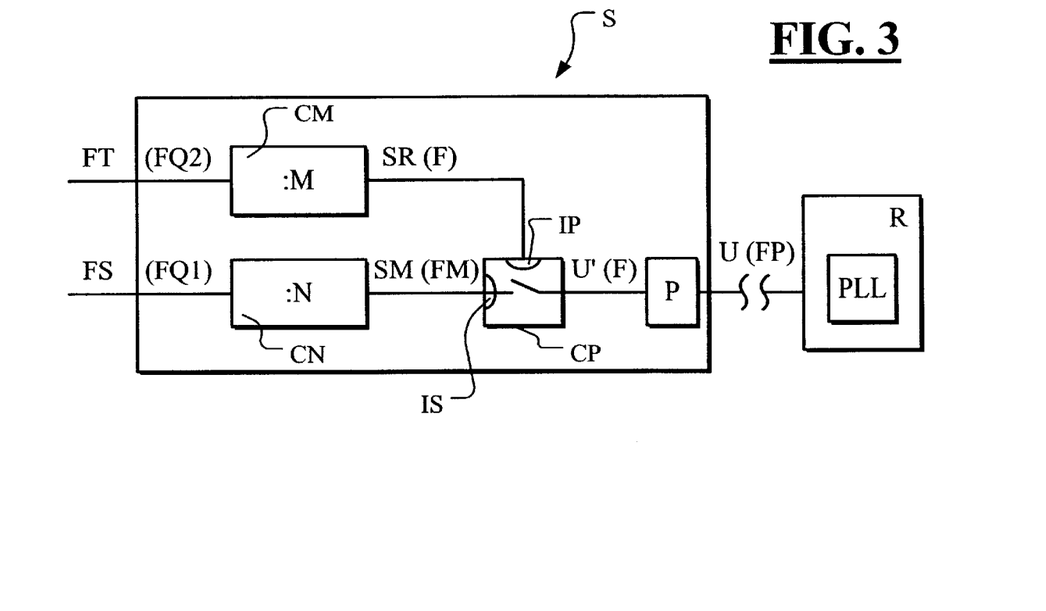
FIG. 3 shows a block diagram of a system for providing information on the clock frequency of a data source in a digital receive-transmit system according to the present invention.

FIG. 3 shows a measuring system for the frequency of a data source S, whose operation is similar to that of the system ET represented in FIG. 1, i.e. complying to ETSI ITU-J81 Standard, having a transmission flow input FT at a frequency FQ2 of 34768 KHz and data flow FS at a frequency FQ1 of 27 MHz, whereas it outputs a binary coded signal U, with logic states 0 and 1 and a frequency FP of 8 KHz, i.e. a period TP of 125 µs, representing the information on the measurement of the frequency FQ1 for the data flow FS. The transmission flow FT is sent to a counter CM, which performs a frequency division for a factor M and whose output has a signal SR at a reduced frequency F, which drives the sampler CP. Thus, the frequency F is the measuring or sampling frequency. The data flow FS, on the contrary, goes through a relevant counter CN, performing a frequency division by a factor N and whose output has a signal SM at a reduced frequency FM, which enters the sampler CP. An output frequency measurement U' from the sampler CP enters then a post-processor P, whose output has the coded signal P, containing the information on the frequency measurement FQ1 of the data flow FS according to ETSI Standard, i.e. it transmits a sequence of '0' and '1' at a frequency of 8 KHz.

In the system ET shown in FIG. 1, both the factor M and factor N representing the frequency divisions applied by counter CM and counter CN respectively, are worth 4296 and 2 respectively, so as to set an 8 KHz sampling frequency of the sampler CP, which corresponds to the frequency of signal SR at reduced frequency F, so as to obtain a sample each phase cycle of the data flow FS.

System S uses a number M and a number N such as to set a number of measurements NUM higher than the frequency FQ1 of the data flow FS in the same period TP used by the system ET. In the system S described above, for instance, number M is worth 1074 instead of 4096, whereas number N is worth 1 instead of 2, so that the signal SR at a reduced frequency F occurs at 32 KHz instead of 8 KHz, whereas the data flow FS divided by 1 gives a signal SM at a reduced frequency FM in line with the 27 MHz frequency FQ1. Said values of reduced frequency F and FM will set in the time TP of 125 µs specified by ETSI Standard 4 frequency measurements FQ1 of the data flow FS within said period. Thus, averaging the 4 measurements of the frequency FQ1 will permit to determine ¼ cycle phase changes of the data flow FS, increasing the measurement precision on frequency measurement U'.

Figure 4:
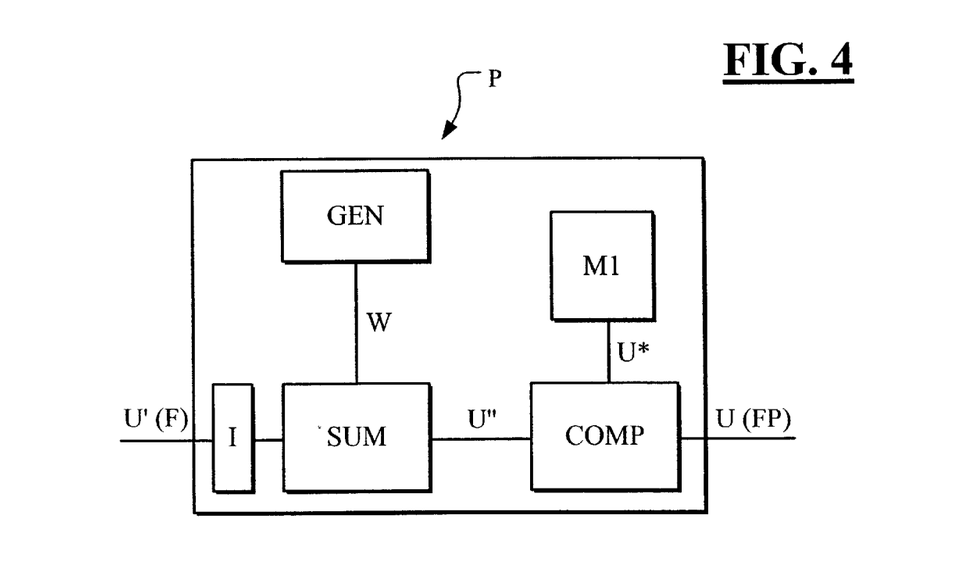
FIG. 4 shows a block diagram of a detail of the system for providing information on the clock frequency of a data source in a digital receive-transmit system according to FIG. 3.

So, the output frequency measurement U' from the sampler CP contains four measurements of the frequency FQ1 for each time period TP of 125 µs, which after averaging may indicate for instance a phase value π/2. Therefore, a coded signal U has to be sent, in compliance with ETSI Standard, which measures every 125 µs the frequency of the data flow FS, expressed by logic states '0' and '1'. However, as a result, the output frequency measurement U' from the sampler CP over a time period TP of 125 µs gives a measurement whose precision Q is higher than precision QP obtainable through ETSI Standard. Consequently, the frequency measurement U' would not be compatible with the above Standard, as it would eventually give a binary signal with a period of 31,25 µs. Therefore, the frequency measurement U' is inserted in the post-processor P, which performs a coding to make it compatible with the receiver R operating according to ETSI Standard specifications and also allows the receiver R to detect precision Q related to the frequency measurement U'. As said, the frequency measurement U' indeed corresponds to four values provided each time by the sampler CP with a period of 31.25 µs. Said four values are generally integrated, i.e. their mean value is evaluated at the input of post-processor P to provide a phase value suitably coded to allow the processing as described hereunder. As it regards the processes performed in the post-processor P, the frequency measurement U' will then be intended as the mean of NUM measurements achieved during a time corresponding to the time TP of 125 µs, converted to phase value. For simplicity, an integrator block 1 is indicated, which performs said averaging operation even if generally speaking said operation as well as the operations described hereafter and the operations related to sampling can be effectively performed by a duly programmed device PLD (Programmable Logic Device). Post-processor P is illustrated more in detail in FIG. 4 where it shows that the frequency measurement value U' of the frequency FQ1 with precision Q enters an adder SUM. A sequence generator GEN is provided, which generates a periodical sequence W of zero mean value, with a period TP, i.e. 8 KHz frequency. Said periodical sequence W is summed in the adder SUM to the frequency measure U' containing the phase measurement of the data flow FS, obtaining an output altered signal U", which is always a phase measurement. The altered signal U" is inserted in a comparator COMP to compare the value of the altered signal U" with the phase value of the last value of the coded signal U* transmitted and stored in a storage means M1. More specifically, post-processor P performs the following steps:

a) it will generate a periodical sequence W through the generator GEN, repeating a 2Q long word W' at zero mean value, consisting eg. of 2Q symbols having values [+1−1+3−3 . . . +(2Q−1)−(2Q−1)]/ 2Q each one transmitted over a period TP of 125 µs.

b) it will sum up to each frequency measurement U' a symbol of the word W' through the adder SUM, obtaining the altered signal U".

c) by means of the comparator COMP, it will compare U" value with a phase value U* stored in a storage means M1, which is the value of the coded signal U previously transmitted and reported as a phase value.

The comparator COMP will transmit the coded signal U according to IF selection rules, i.e.:

i) if U">U* U=1 ii) if U"<U* U=0 iii) if U"=U* the value attributed to the coded signal U is irrelevant, for instance a coded signal U is transmitted, which is the negation of the previous signal U*.

iv) a cycle is summed to or deducted from U* according to whether step i) or ii) has occurred, respectively.

The sum of the sequence W that has an increasingly oscillating nature, has no effect at the frequency value U' containing the phase measurement if the phase measurement change is around zero, which implies the absence of phase shifts. When the phase measurement detects a shift with respect to the zero of ½Q, the coded signal U is altered to cancel the quantity of the deviation itself.

As a result, the output coded signal U containing a frequency measurement FQ1 associated with a higher precision Q will be coded in the example on 4 symbols, which have to be transmitted at the preset 8 KHz frequency FP as specified by ETSI Standard and will require a longer measurement transmission time T than according to the system ET of FIG. 1. More specifically, since precision Q is quadruplicated, there will be a four times longer measurement transmission time T. This is practicable, since the phase locked loop PLL performs over longer time intervals, in the specific instance in the order of the frame frequency of a television set, so that transmission time for measurement T may even take longer than 125 µs as specified by ETSI Standard.

Figure 5:
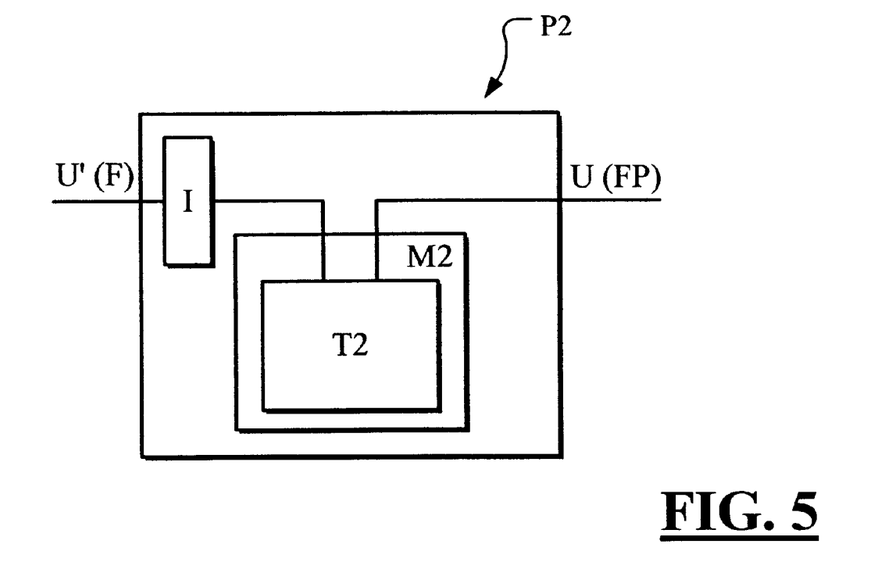
FIG. 5 shows a block diagram of a variant to the detail of the system for providing information on the clock frequency of a data source in a digital receive-transmit system according to FIG. 3.
Figure 6:
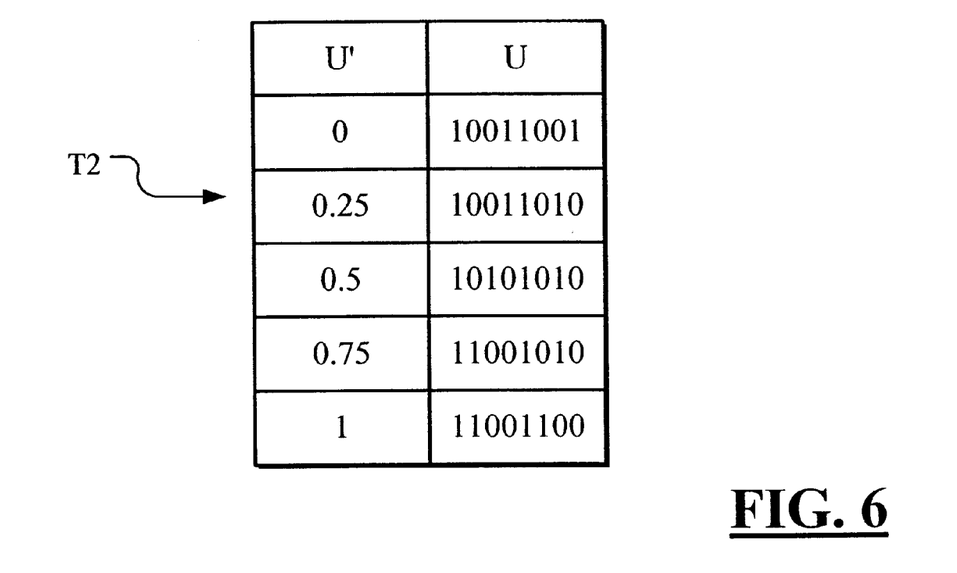
FIG. 6 shows a tabular diagram related to the variant of FIG. 5.

FIG. 5 shows a post-processor P2 that may be used instead of post-processor P of FIG. 4. Said post-processor P2 simply consists of a memory M2 containing a table T2 as shown in FIG. 6. Instead of using an algorithm to produce the coded signal U as in the post-processor P, quite simply, as also the frequency measurement U' itself is discretized, the frequency measurement U' averaged over the period TP and the coded signal U will be put correlated through Table 2. This will give a coded signal U similar to the one produced by the post-processor P, with the only difference that post-processor P2 does not perform any comparisons nor based on some algorithms processing on the frequency measurement U'.

Thus an advantageous system is obtained to provide information on the clock frequency of a data source in a digital receive-transmit system which outputs a coded signal U compatible with the ETSI Standard, but whose error, because of the summed zero-mean value periodical sequence W, is now changing at a higher frequency, though maintaining a zero mean value, i.e. leaving the mean value of the coded signal U unchanged. Since the phase locked loop PLL is not capable on its own to follow such a changing frequency of the coded signal U, it will perform an integration thereof which, in consideration of the coding performed by the post-processor P an integration will bring back a mean value of the coded signal U that varies with precision Q of ¼ cycle. Thus, the receiver R will be able to detect and remove the 'jitter' more efficiently, as the 'jitter' occurs now at a higher frequency than with the systems ET and AAL shown in FIGS. 1 and 2.

The characteristics and features of the present invention as well as its advantages are apparent from the above description.

The system for providing information on the clock frequency of a data source in a digital receive-transmit system as described by way of example allows obtaining a coded signal that enters the phase locked loop, wherein the error associated with the phase measurement varies at a higher frequency, whereas the error mean value remains zero. Thus, the 'jitter' is shifted at a higher frequency due to a more precise measurement of the frequency and associated coding.

Advantageously, the system for providing information on the clock frequency of a data source in a digital receive-transmit system according to the present invention can be favourably implemented in known standardized systems, such as any systems conforming to ETSI and AAL1 Standards, as this will simply require a change to the frequency dividers and an additional post-processor.

As to application in AAL1 the post-processor algorithm simply needs to be changed to transmit the modulo-16 measurement through 4 bits, instead of transmitting the modulo-2 measurement through 1 bit.

It is obvious that many changes to the system for providing information on the clock frequency of a data source in a digital receive-transmit system as described by way of example are possible for the skilled in the art without departing from the novelty principles of the innovative solution, and it is also clear that in practical embodiment of the invention the details shown may often differ in form and size from the ones described and be replaced with technical equivalent elements.

Specifically, several frequency division ratios can be set to increase the number of measurements. An optimal solution provides in fact for a selection of two dividing ratios, for the data flow and transmission flow, to have the values of the two obtained frequencies be prime numbers to each other. In the instance of the ETSI system, since the highest common factor of both frequencies is 24, it may be choosen to divide the transmission flow frequency by 24 and the data flow frequency by 1 to obtain 179 different samples of the frequency phase of the data flow in 125 µs.

Both the sampler and the post-processor in general can be part of one signal processor circuit implementing both functions.

Moreover, since the signal phase and frequency are dual quantities for 'jitter' detection, changes from one to the other quantity may be performed in between the sampling and transmission to the receiver, as it will prove more convenient, but without departing from the innovative method as claimed in the annexed claims.

Other possible changes may concern the way the frequency measurements are coded in order to obtain a coded signal suitable for the receiver to detect the measurement according to the precision preset by selecting the frequency ratios. Such a coding method may include algorithms of various type, such as the use of memory stored tables or a joint use of algorithms and tables.

What is claimed is:

1. A system for providing information about clock frequency of a data source in a digital receive-transmit system, wherein the clock frequency of the data source has a value which is sent at a preset rate (FP), in order to ensure correct reception of information by receiver means (R), comprising:

measuring means (CP, CN, CM) for performing a frequency measurement (U') of a first frequency (FQ1) of a first signal (FS) as compared to a second frequency (FQ2) of a second signal (FT), wherein said first frequency (FQ1) is associated with the data source, wherein said second frequency (FQ2) is associated with the transmission system and is used as a reference signal to measure the first signal (FS), and wherein said measuring means (CP, CN, CM) are prearranged to perform said measurement (U') at a measuring rate (F) higher than said preset rate (FP); and post-processing means (P) for coding the frequency measurement (U') and supplying a coded signal (U) at said preset rate (FP) to the receiver means (R), wherein the post-processing means (P) maintains in the frequency measurement (U') a precision (Q) supplied by the measurement means (CP, CN, CM) and determined by the measuring rate (F), and wherein the precision (Q) is higher than a precision (QP) determined by the preset rate (FP).

2. A system for providing information on clock frequency of a data source in a digital receive-transmit system according to claim 1, wherein:

the post-processing means (P) transmits said coded signal (U) corresponding to the frequency measurement (U') for a time interval (T); and said time interval (T) is substantially proportional to the precision (Q) of the frequency measurement (U').

3. A system for providing information on clock frequency of a data source in a digital receive-transmit system according to claim 2, wherein:

the post-processing means (P) codes the frequency measurement (U') and supplies said coded signal (U), the coded signal (U) has an instantaneous value which changes quickly compared to the frequency measurement (U'), and the mean value of the coded signal (U) is the same as for the frequency measurement (U'), so that the receiver means (R) can detect the frequency measurement (U') with the higher precision (Q) of said measuring means (CP, CM, CN).

4. A system for providing information on clock frequency of a data source in a digital receive-transmit system according to claim 3, wherein:

the measuring means comprise a sampler means (CP); and the measuring means further comprise a first and second frequency divider means (CN, CM) associated with the first signal (FS) and the second signal (FT), respectively.

5. A system for providing information on clock frequency of a data source in a digital receive-transmit system according to claim 4, wherein:

the first frequency of the first signal (FS) is divided by the first frequency divider means (CN) according to a first factor (N), the first frequency of the first signal (FS) supplies a first input signal (FM) that feeds a first input (IS) of the sampler means (CP), the second frequency of the second signal (FT) is divided by the second frequency divider means (CM) according to a second factor (M), and the second frequency of the second signal (FT) supplies a second input signal (F) that feeds a second input (IP) of the sampler means (CP).

6. A system for providing information on clock frequency of a data source in a digital receive-transmit system according to claim 5, wherein:

the first factor (N) and the second factor (M) set a measuring rate determining a number of measurements (NUM), and the measuring rate determining said number of measurements (NUM) is higher compared to the measuring rate (F) determined according to the preset rate (FP) in the time interval (T).

7. A system for providing information on clock frequency of a data source in a digital receive-transmit system according to claim 5, wherein:

the first input of the sampler means (CP) is the signal input (IS), and the second input of the sampler means (CP) is the sampling input (IP).

8. A system for providing information on clock frequency of a data source in a digital receive-transmit system according to claim 5, wherein:

the first input of the sampler means (CP) is the sampling input (IP), and the second input of the sampler means (CP) is the signal input (IS).

9. A system for providing information on clock frequency of a data source in a digital receive-transmit system according to claim 7, wherein the first signal (FS) at the first frequency (FQ1), the second signal (FT) at the second frequency (FQ2), and the coded signal (U) are compatible with ITU J.81 Recommendation.

10. A system for providing information on clock frequency of a data source in a digital receive-transmit system according to claim 8, wherein the first signal (FS) at the first frequency (FQ1), the second signal (FT) at the second frequency (FQ2), and the coded signal (U) are compatible with ITU-T 1.363 Recommendation.

11. A system for providing information on clock frequency of a data source in a digital receive-transmit system according to claim 2, wherein:

the frequency measurement (U') according to the measuring rate (F) is processed by the post-processing means (P), and the post-processing means (P) comprises suitable means (SUM, GEN) to alter the frequency measurement (U') and comprises means to perform a comparison (COMP, M1) with a last frequency value (U*) transmitted.

12. A system for providing information on clock frequency of a data source in a digital receive-transmit system according to claim 11, wherein the post-processing means (P) further comprises:

a sequence generator means (GEN) for generating a periodical sequence (W);

an adder means (SUM) to sum the periodical sequence (W) to the frequency measurement (U') and obtain an altered sequence (U");

a storage means (Ml) capable of storing said last frequency value (U*) transmitted; and a comparator means (COMP) to make the comparison between the altered sequence (U") and the last value (U*) transmitted, in order to transmit the coded signal (U) depending on the comparison.

13. A system for providing information on clock frequency of a data source in a digital receive-transmit system according to claim 12, wherein the sequence generator means (GEN) generates a periodical sequence (W) by repeating a word (W') at a zero mean value.

14. A system for providing information on clock frequency of a data source in a digital receive-transmit system according to claim 2, wherein:

the post-processing means (P) comprises a storage means (M2), and the storage means (M2) stores given sequences (T2) corresponding to the values of the frequency measurements (U').

15. A method for measuring frequency of a data source comprising the following steps:

a) processing a first signal (FS) at a first frequency (FQ1) associated with the data source by performing a frequency division according to a first factor (N);

b) processing a second signal (FT) at a second frequency (FQ2) associated with a transmission flow by performing a frequency division according to a second factor (M);

c) using the second frequency (FQ2) of the second signal (FT), divided by the second factor (M) as a reference frequency (F, FR) to measure the first frequency (FQ1) divided by the first factor (N) of the first signal (FT);

d) sending a coded measurement (U) of the first frequency (FQ1) to a receiver (R) at a preset rate (FP) and a precision (QP) as determined by the preset rate (FP);

characterized in that the method provides the following additional steps:

c') selecting the first and second factors (N, M) to set a measuring rate (F) determining a higher number of measurements (NUM) in the time interval (TP) compared to the number of measurements as determined by the preset rate (FP);

c") calculating the mean value over said time interval (TP) of said higher number of measurements (NUM), obtaining a frequency measurement (U') associated with a precision (Q) that is higher than the precision (QP) determined by the preset rate (FP) and a frequency equal to the preset rate (FP); and c''') coding the frequency measurement (U') to obtain a coded signal (U) having the same frequency of the preset rate (FP), so that compared to the receiver (R) the coded signal has a mean value equal to that of the frequency measurement (U') and an error that varies more rapidly.

16. A method for measuring frequency of a data source according to claim 15, characterized in that for each frequency measurement (U') to be transmitted, the coded signal (U) requires a longer time interval (T) than the time interval (TP) determined by the preset rate (FP).

17. A method for measuring frequency of a data source according to claim 16, characterized in that the coded signal (U) is obtained by processing the frequency measurement (U') through a special coding procedure, which requires the storage of data related to the frequency measurement (U') associated with a higher precision (Q).

18. A method for measuring frequency of a data source according to claim 16, characterized in that the coded signal (U) is obtained having the frequency measurement (U') values correspond to preset sequences (T2) contained in suitable storage means (M2).

19. A method for measuring frequency of a data source according to claim 17, characterized in that said coding procedure provides the following steps:

a) summing a corresponding value of a rated sequence (W) obtained by repeating a word (W) at a zero mean value to each frequency measurement (U'), consisting of a number of symbols equal to precision (Q) and ±½ Q value, to obtain an altered sequence (U");

b) evaluating of the value assumed by the altered sequence (U") and transmitting the value of the coded signal (U) according to determined selection rules (IF); and c) storing the last value (U*) transmitted of the coded signal (U).

20. A method for measuring frequency of a data source according to claim 19, characterized in that the selection rules (IF) are:

a) if the value of the altered sequence (U") is higher than the last value (U*) transmitted, the coded signal (U) will have the "1" logic value;

b) if the value of the altered sequence (U"9) is lower than the last value (U*) transmitted, the coded signal (U) will have the "0" logic value;

c) if the value of the altered sequence (U") is equal to the last value (U*) transmitted, a coded signal (U) will be transmitted, which is the negation of the last value (U*) transmitted; and d) the last value (U*) transmitted is updated to represent a phase value less one cycle if item a) has occurred or plus one cycle if item b) has occurred.

21. A transmission apparatus, for sending clock frequency value of a data source at a preset rate, in order to ensure correct reception of information at a receiver means (R), comprising:

a first signal (FS) at a first frequency (FQ1) associated with the data source;

a second signal (FT) at a second frequency (FQ2) associated with the transmission system, said second signal (FT) used as a reference signal to measure the first signal (FS); and measuring means (CP, CN, CM) for measuring the first frequency (FQ1) of the first signal (FS) compared to the second frequency (FQ2) of the second signal (FT), wherein said measuring means (CP, CN, CM) for frequency measurement (U') of the first frequency (FQ1) of the first signal (FS) are prearranged to perform said measurement (U') at a measuring rate (F) higher than a preset rate (FP), wherein a post-processing means (P) is provided to code the frequency measurement (U') and supply a coded signal (U) at said preset rate (FP) to the receiver means (R), wherein the post-processing means (P) maintains in the frequency measurement (U') a precision (Q) supplied by the measurement means (CP, CN, CM) and determined by the measuring rate (F), and wherein the precision (Q) is higher than a precision (QP) determined by the preset rate (FP).

* * * * *

UNITED STATES PATENT AND TRADEMARK OFFICE
CERTIFICATE OF CORRECTION

PATENT NO.    : 6,320,911 B1                                             Page 1 of 1
DATED         : November 20, 2001
INVENTOR(S)   : Cucchi et al.

It is certified that error appears in the above-identified patent and that said Letters Patent is hereby corrected as shown below:

<u>Title page,</u>
Item [56], References Cited, after the last U.S. PATENT DOCUMENT listed, please insert -- FOREIGN PATENT DOCUMENTS - 0637137, 02/01/1995, Europe --.

<u>Column 12,</u>
Line 4, please delete "a" and substitute therefor -- I --.
Line 7, please delete "b" and substitute therefor -- II --.
Line 10, please delete "c" and substitute therefor -- III --.
Line 14, please delete "d" and substitute therefor -- IV --.
Line 15, please delete "item a" and substitute therefor -- selection rules I --.
Line 16, please delete "item b" and substitute therefor -- selection rules II --.

Signed and Sealed this

Tenth Day of September, 2002

*Attest:*

JAMES E. ROGAN
*Attesting Officer*      *Director of the United States Patent and Trademark Office*